March 14, 1967 C. M. MONTGOMERY ET AL 3,309,598
DRY CELL BATTERY CHARGER UTILIZING AUTOMOBILE
CIGAR LIGHTER SOCKET
Filed March 31, 1964

INVENTORS
CARROL M. MONTGOMERY
and PAUL V. RUFF
BY
Lockwood, Woodard, Smith & Weikart
Attorneys

United States Patent Office 3,309,598
Patented Mar. 14, 1967

3,309,598
DRY CELL BATTERY CHARGER UTILIZING AUTOMOBILE CIGAR LIGHTER SOCKET
Carrol M. Montgomery, Box 620D, R.R. 1, and Paul V. Ruff, Box 619D, R.R. 1, both of Anderson, Ind. 46011
Filed Mar. 31, 1964, Ser. No. 356,237
5 Claims. (Cl. 320—2)

This invention relates generally to batteries and more particularly to a means and method for recharging dry cells conveniently.

Dry cell batteries are well known and widely used. However, their useful life is somewhat limited and frequently, because of poor performance, they are discarded before necessary. Moreover, it frequently occurs that such batteries have insufficient energy therein to function properly to operate the devices in which they are used. However, if subjected to a charging potential for a comparatively short period of time, they can be reconditioned so as to be adequate for an additional period of time.

Heretofore, devices have been devised for recharging dry cell batteries. However, such devices are inconvenient, if not impossible to use, particularly with dry cells as they are presently manufactured in quantity.

It is, therefore, a general object of the present invention to provide an inexpensive and reliable means for recharging dry cells.

A further object is to provide a device useful with a variety of dry cells employing the various constructions presently in use in dry cells.

A further object is to provide a device achieving the foregoing objects and characterized by exceptional convenience in use.

Described briefly, a typical embodiment of the present invention includes a plastic body having a dry cell receiving cavity therein and an adapter stem whereby it is receivable in a low voltage electric cigar lighter socket of an automobile, for example. The body of the device is provided with a resilient electrical wire formed to make contact with one conductor of the socket as well as with a part of a closure member employed on the body thereof. A second conductor extends from the front of the stem to the interior of the cavity to make contact with a center terminal of a dry cell received therein.

A closure member is provided which is slidably received on the outside of the receiver portion of the body. This closure member has a resilient, electrically conductive spring coil therein, a portion of which engages the negative terminal of the battery and a portion of which engages the first mentioned conductor of the device. The closure is moved toward the stem as the stem is inserted in the lighter socket whereupon a completed circuit is made through the battery and lighter socket for recharging the battery. Holding the assembly in position in the lighter socket for a period of from six to ten seconds is effective to recondition the battery cell for a considerable period of time.

The full nature of the invention will be understood from the accompanying drawings and the following description and claims.

Figure 1:
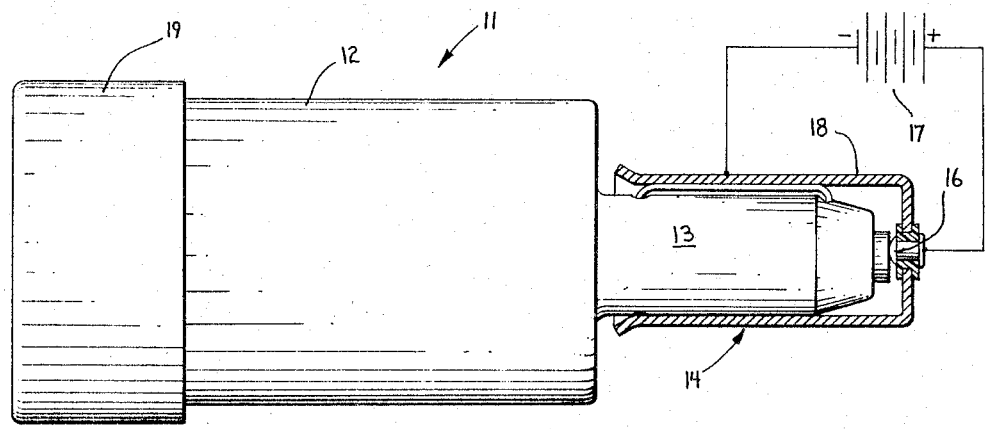
FIG. 1 is an elevational view of the device of the present invention received in a cigar lighter socket shown in section and connected to an energy source shown schematically.

Referring now to the drawings in detail, the charger includes a body 11 having a cell receiver 12 and adapter or stem 13 received in the cigar lighter socket 14 of an automobile, for example. The socket has a central terminal 16 therein connected to the positive terminal of the vehicle storage battery 17. The shell 18 of the socket, or a portion thereof is connected to the negative terminal of the storage battery and is, of course, insulated from the central terminal 16 of the socket. A cup-shaped closure 19 is provided on the receiver portion 12 of the body 11.

Figure 2:
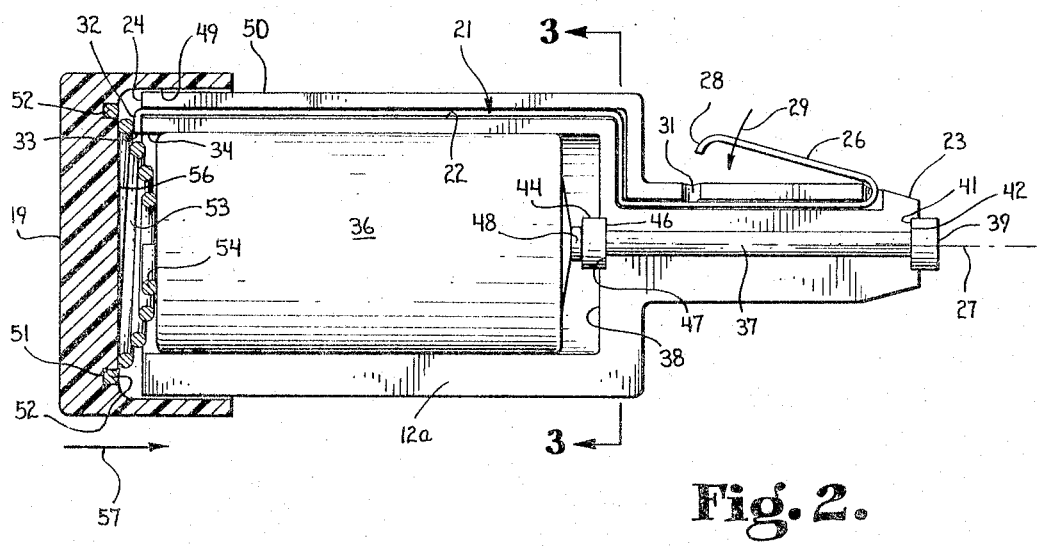
FIG. 2 is a longitudinal section through the charger.
Figure 3:
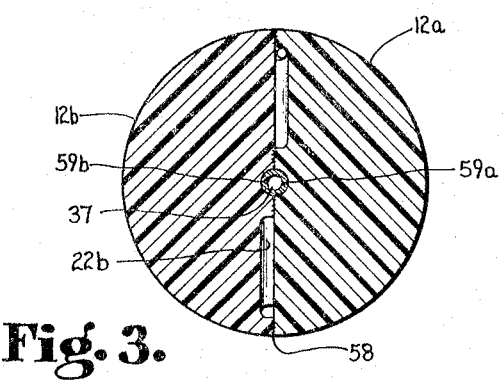
FIG. 3 is a transverse section taken along the line 3—3 in FIG. 2 and viewed in the direction of the arrows.

As shown in FIGS. 2 and 3, an electrically conductive wire 21 is received in a groove 22 which extends from near the front end 23 of the stem to the rear end 24 of the receiver. This wire 21 has a portion 26 extending radially outwardly with respect to the axis 27 of the stem. A portion 28 joins portion 26 and extends radially inwardly toward the axis 27, both portions 26 and 28 lying in a plane containing the axis 27. Because of this arrangement of the wire 21, it is well adapted to be easily insertable into a lighter socket and to be resiliently deformed in the direction of the arrow 29 upon insertion into the socket. It can be deformed to whatever extent is necessary to enable insertion into the socket and yet, being resilient, firmly maintains electrical contact with the shell 18 of the socket. A recess 31 is provided to receive the portion 28 in the event there is a rather tight fit between the stem and the socket.

The rear end 32 of the wire 21 extends radially inwardly from the groove 22 where the groove meets the end 24 of the body. However, this portion 32 terminates at 33 adjacent the inner cylindrical surface 34 of the cavity receiving the battery 36. In this way, the portion 32 is disposed for support by the rear end 24 of the receiver between the groove and the inner surface 34, and yet will not interfere with installation and removal of the battery cell 36.

Another electrical conductor 37 extends from the front end 23 of the stem to the front wall 38 of the cavity receiving the cell 36. The front exposed portion 39 of the central conductor 37 is supported against rearward motion by the abutting engagement of the flange 41 thereof with a seat 42 in the stem. Similarly, the rear exposed end 44 of the central conductor is prevented from forward motion in the body by means of the abutting engagement of the face 46 thereof with the shoulder 47 in the body. The advantage of the rigid integral construction of this central conductor is the fact that it can be easily assembled, will not become loose, and will maintain a reliable contact between the center terminal 16 of the socket and the center terminal 48 of the battery cell during the use of the invention.

The closure has an inner cylindrical surface 49 slidingly receivable on the outer cylindrical surface 50 of the body. The closure cap also has the annular groove 51 therein receiving the end coil 52 of the coil spring 53. This can be a tight fit so that the spring will remain in position even though the closure is removed from the body 11. Normally, when the closure is removed, the front end coil 54 of the spring is extended substantially from the surface 56. Then, when the closure is moved into position in the direction of the arrow 57 after a cell is inserted into the cavity, the spring will engage the rear end conductive portion of the cell and urge the cell forwardly in the cavity as the closure is moved forwardly on the body. Forward movement of the closure on the body will be stopped when there is engagement of one of the coils of the spring with the portion 32 of the wire 21. This will occur after the stem has been inserted into the socket. Then, by merely holding a slight forward force against the assembly to maintain the contact between the coil and the wire portion 32, an electrical circuit will be completed from the vehicle storage battery 17 through the cell 36 and back to the storage battery. It can be held in this condition for a period of from six to ten seconds, whereupon the cell will be rejuvenated and useful for an additional period of time.

One important feature of the present invention is the fact that the body of the device is made of two identical shells of electrically non-conductive material such as plastic, for example. These are secured together by the use of an adhesive 58. As is apparent in FIG. 3, one of the shells is identified with reference numeral 12a and the other with reference numeral 12b. The groove in the shell 12a receives the wire 21. The groove 22b in the shell 12b is inactive and yet it does not detract from the appearance of the unit, as it will not be seen from the exterior and it in no way interferes with the performance of the unit. The groove 59a in shell 12a receives half of the central conductor 37 whereas the groove 59b in the shell 12b receives the other half of the central conductor. Naturally, because the shell 12b is identical to 12a, it also has apertures in the stem thereof communicating with the groove 22b and corresponding to the apertures 30 and 31 of the shell 12a. However, these in no way detract from the performance or appearance of the device.

More than one cell can be reconditioned at one time if the unit is modified to accommodate more than one cell at a time. The use of a single spring wire received in the groove 22 and formed to properly fit and be retained in the groove without snapping out before the two shells are put together, facilitates the assembly of the device, assures a reliable circuit path, and yet accommodates the use of the device in lighter sockets varying somewhat in size, as described above.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. A battery cell charging device comprising:
a body having a generally cylindrical cell receiver with a cavity therein to receive an electric battery cell, and said body having a mounting stem with a generally cylindrical outer surface formed for reception in a low voltage electric cigar lighter socket, said body being formed of two identical plastic shells secured together in face-to-face relationship, each shell having a flat face abuttingly engaged with the corresponding flat face of the other shell;
a groove in the flat face of one of said shells and extending near an outer margin of said shell from a point on said stem to a rear end of said receiver;
an electric battery cell in said receiver;
a first resilient electrical conductor received in said groove and retained in said groove by the flat face of said other shell, said first conductor having a first portion projecting outwardly from said stem for engagement with a conductive portion of a cigar lighter socket, and said first conductor having a second portion joining said first portion and extending inwardly therefrom, and said first conductor having a third portion extending from said receiver;
and a cup shaped closure received on said receiver and having conductor means thereon for engaging said third portion of said first conductor and said cell to make an electrical path between said first conductor and said cell;
and a second electrical conductor having a first exposed portion at the front end of said stem and a second exposed portion at the said cavity, both of said exposed portions being rigidly supported for making contact with a conductor in the lighter socket and with said cell;
whereby electrical energy available at the lighter socket is applicable to said cell for recharging thereof, and a storage battery energizing said socket.

2. A charging device as set forth in claim 1 wherein:
said stem and said cavity have colinear axes, and said first conductor is a spring wire and the said first and second portions thereof lie in a plane containing the axis of said stem, and said stem has a recess therein to receive a part of said second portion of said wire when said stem is received in a lighter socket and the said first and second portions of wire are deflected radially inwardly by the socket.

3. A charging device as set forth in claim 1 wherein:
the cavity in said receiver opens at the rear end of said receiver and said first conductor is a spring wire and the said third portion thereof extends from said groove to the margin of said cavity at said rear end and is supported by a portion of said rear end between said cavity and said groove to facilitate firm engagement thereof by said conductor means of said closure.

4. A device as set forth in claim 1 wherein:
said second conductor is rigid and said exposed portions thereof are integral with a concealed portion extending between said exposed portions thereof, said exposed portions and said concealed portion all being formed of one piece of material.

5. A device as set forth in claim 1 wherein:
said closure is slidingly receivable on said receiver and said conductor means comprise a resilient coil spring.

References Cited by the Examiner

UNITED STATES PATENTS

| | | | |
|---|---|---|---|
| 2,876,410 | 3/1959 | Fry | 320—48 |
| 2,880,306 | 3/1959 | Witte | 320—51 X |
| 2,954,544 | 9/1960 | Focosi | 339—182 |
| 3,109,132 | 10/1963 | Witte | 320—2 X |
| 3,217,224 | 11/1965 | Sherwood | 320—2 |

JOHN F. COUCH, *Primary Examiner.*

S. WEINBERG, *Assistant Examiner.*